United States Patent
Abraham et al.

[11] Patent Number: 5,953,414
[45] Date of Patent: Sep. 14, 1999

[54] PIEZO-ELECTRIC SPEAKER CAPSULE FOR TELEPHONE HANDSET

[75] Inventors: Denis Abraham, Vanves; Stéphane Dufosse, Cormeilles En Parisis, both of France

[73] Assignee: Alcatel, Paris, France

[21] Appl. No.: 08/966,978

[22] Filed: Nov. 10, 1997

[30] Foreign Application Priority Data

Nov. 14, 1996 [FR] France .................................. 96 13870

[51] Int. Cl.$^6$ .................................................. H04M 1/03
[52] U.S. Cl. ........................ 379/433; 379/428; 379/434; 381/190
[58] Field of Search ................................ 379/433, 428, 379/434; 381/190, 173, 114

[56] References Cited

U.S. PATENT DOCUMENTS

| | | | |
|---|---|---|---|
| 3,952,159 | 4/1976 | Schott | 179/1 |
| 4,006,371 | 2/1977 | Quirke | 310/8.2 |
| 4,990,816 | 2/1991 | Causse et al. | 310/324 |
| 5,081,674 | 1/1992 | Wijas et al. | 379/433 |
| 5,195,142 | 3/1993 | D'Avolio et al. | 381/173 |
| 5,201,069 | 4/1993 | Barbolak | 455/90 |
| 5,729,605 | 3/1998 | Bobisuthi et al. | 379/430 |
| 5,784,340 | 7/1998 | Kanai | 367/140 |
| 5,790,679 | 8/1998 | Hawker et al. | 381/163 |

FOREIGN PATENT DOCUMENTS

| | | |
|---|---|---|
| 0595514A2 | 5/1994 | European Pat. Off. |
| 2665045A1 | 1/1992 | France |

OTHER PUBLICATIONS

Patent Abstracts of Japan, vol. 010, No. 069 (E–389), Mar. 18, 1986 corresponding to JP 60 218988 A (Matsushitq Denki Sangyo) dated Nov. 1, 1985.

*Primary Examiner*—Scott Wolinsky
*Assistant Examiner*—Roland G. Foster
*Attorney, Agent, or Firm*—Sughrue, Mion, Zinn, Macpeak & Seas, PLLC

[57] ABSTRACT

A telephone handset includes a housing containing an earpiece part including a piezo-electric disk joined to an electrically conductive support disk, the edge of the support disk being clamped between two holding parts and separating a rear volume from a front volume. The rear volume is delimited by the combination of the piezo-electric disk and its support disk and by a rear wall facing this combination and a circular lateral wall, the rear wall and the lateral wall constituting a rear part with micro-leaks to constitute with the rear volume an acoustic damper device. The front volume, on the other side of the aforementioned combination constitutes, with holes in a wall of the front volume facing the latter combination, a Helmoltz resonator. The housing further contains a board supporting electronic components in direct contact with the rear wall of the rear volume.

4 Claims, 3 Drawing Sheets

PIEZO-ELECTRIC SPEAKER CAPSULE FOR TELEPHONE HANDSET

BACKGROUND OF THE INVENTION

1. Field of the Invention

The present invention concerns a telephone handset and relates to the earpiece part of the handset. The aim of the invention is to reduce the thickness of the handset in the area of the earpiece part.

The invention applies in particular to mobile telephone handsets. It is particularly necessary to reduce the volume and more particularly the thickness of these devices since they are intended to be carried in the user's pocket.

2. Description of the Prior Art

FIG. 1 shows the earpiece part of a prior art telephone handset. It comprises a housing 1 in which an earpiece capsule 2 is mounted.

The earpiece capsule essentially comprises a piezo-electric (ceramic) disk 3 glued to a metal disk 4.

Alternating electric voltage variations applied to the terminals of this assembly generate alternating vibration of the assembly at the same frequency as the voltage variations and therefore produce sound pressure waves. However, the response curve of the system representing the amplitude of the sound vibrations as a function of the excitation frequency has a peak corresponding to its natural frequency (around 1 000 Hz) and high attenuation beyond that frequency.

To obtain an acceptable response curve in the range of voice frequencies, it is necessary to damp the natural frequency and to amplify high frequencies.

An acoustic resistance is therefore placed behind he vibrating assembly 3, 4 to damp the peak and a Helmoltz resonator is placed in front of this assembly to amplify high frequencies.

To this end, the disk 4 is clamped between two parts 5 and 6 forming a capsule 2 and there is a hole 7 through the rear wall 6 covered by a fabric 8 the role of which is to constitute micro-holes creating an acoustic resistance.

The Helmoltz resonator for amplifying high frequencies consists of the volume 9 behind the disk 4 and the part 5 and a few holes 10 having a diameter in the order of 1 mm in the front wall of the part 5.

To avoid disrupting the operation of the acoustic resistance it is necessary to leave a gap x of 1 mm to 2 mm behind the rear wall of the part 6 of the capsule 2.

The printed circuit board 11 carrying the electronic components 12 of the handset therefore cannot be at a distance less than this value x from the rear wall of the capsule 2.

A circular gasket having a thickness e of approximately 1 mm is disposed between the earpiece capsule 2 and the wall 1 of the housing.

An aim of the present invention is to propose a telephone handset in which the earpiece part is thinner. The invention therefore provides a structural arrangement enabling this thickness to be reduced.

SUMMARY OF THE INVENTION

Accordingly, the invention consists in a telephone handset including a housing containing an earpiece part including a piezo-electric disk joined to an electrically conductive support disk, the edge of the support disk being clamped between two holding parts and separating a rear volume delimited by the combination of the piezo-electric disk and its support disk, a rear wall facing the combination and a circular lateral wall, the rear wall and the lateral wall constituting a rear part adapted to allow micro-leaks to constitute, in conjunction with the rear volume, an acoustic damper device, and a front volume, on the other side of the combination, and constituting, in conjunction with holes in a wall of the front volume facing the combination, a Helmoltz resonator, and a board supporting electronic components in direct contact with the rear wall of the rear volume.

In accordance with another feature, the wall of the front volume facing the combination is part of the housing and constitutes the part of the wall of the housing adapted to be in contact with an ear of a user, the front volume also having a circular lateral wall constituting part of the housing and delimiting the aforementioned volume.

In one particular embodiment, said micro-leaks are enabled to escape from the rear part via lateral slots.

One embodiment of the invention will now be described with reference to the accompanying drawings.

DETAILED DESCRIPTION OF THE PREFERRED EMBODIMENT

Figure 1:
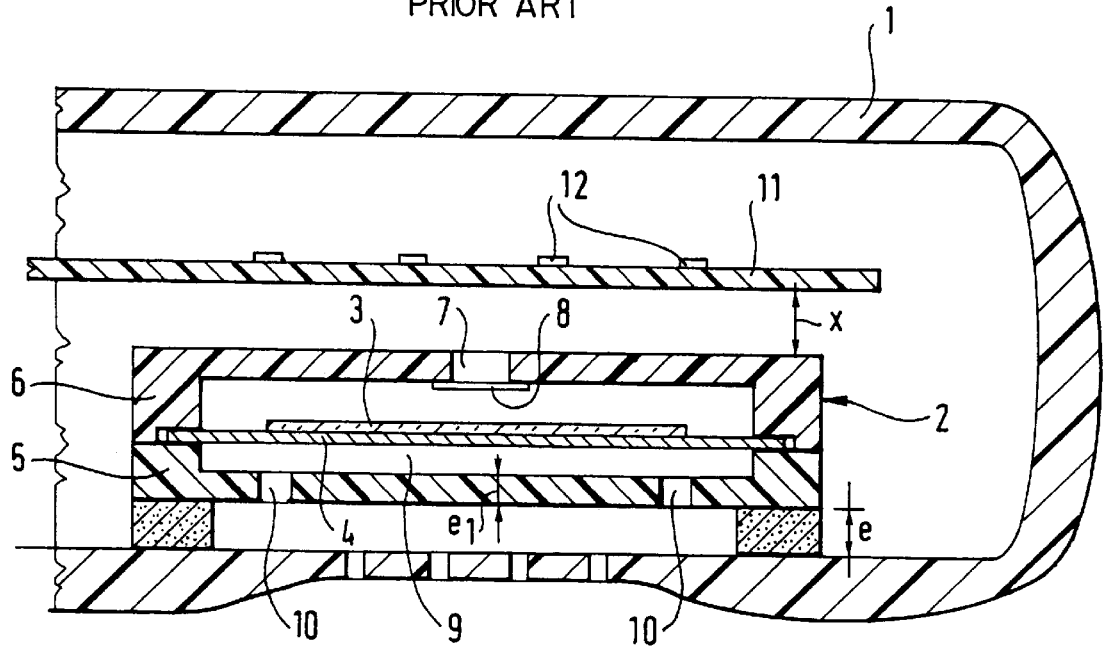
FIG. 1 is a schematic part-sectional view of the earpiece part of a prior art telephone handset described above.
Figure 2:
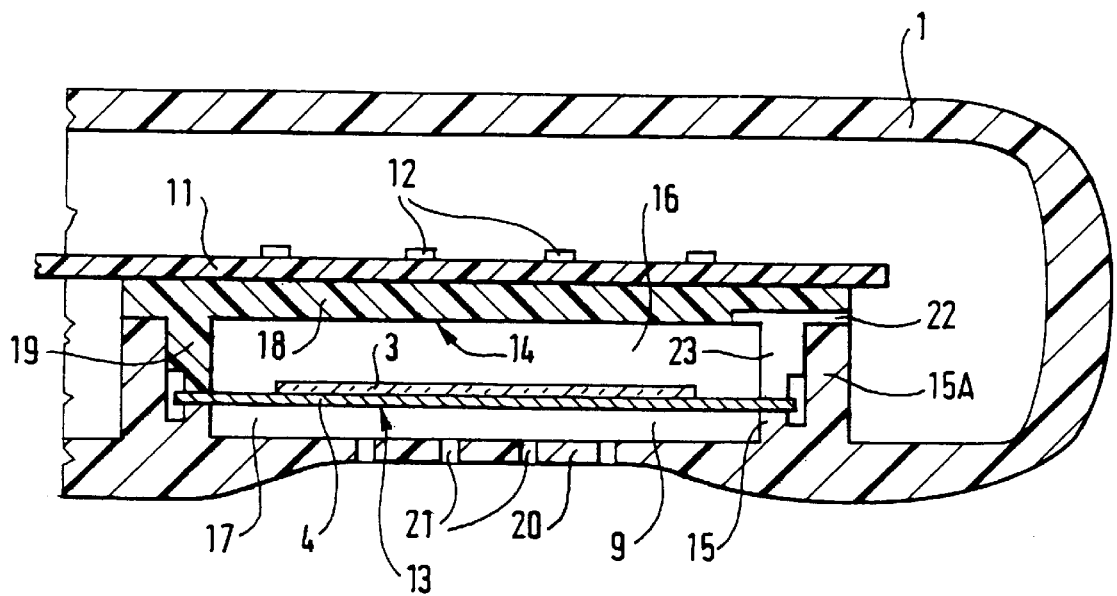
FIG. 2 is equivalent to FIG. 1 but shows a telephone handset of the invention. In this figure, the part 14 shown separately in FIG. 3 is seen in section taken along the line A—A in FIG. 3.
Figure 3:
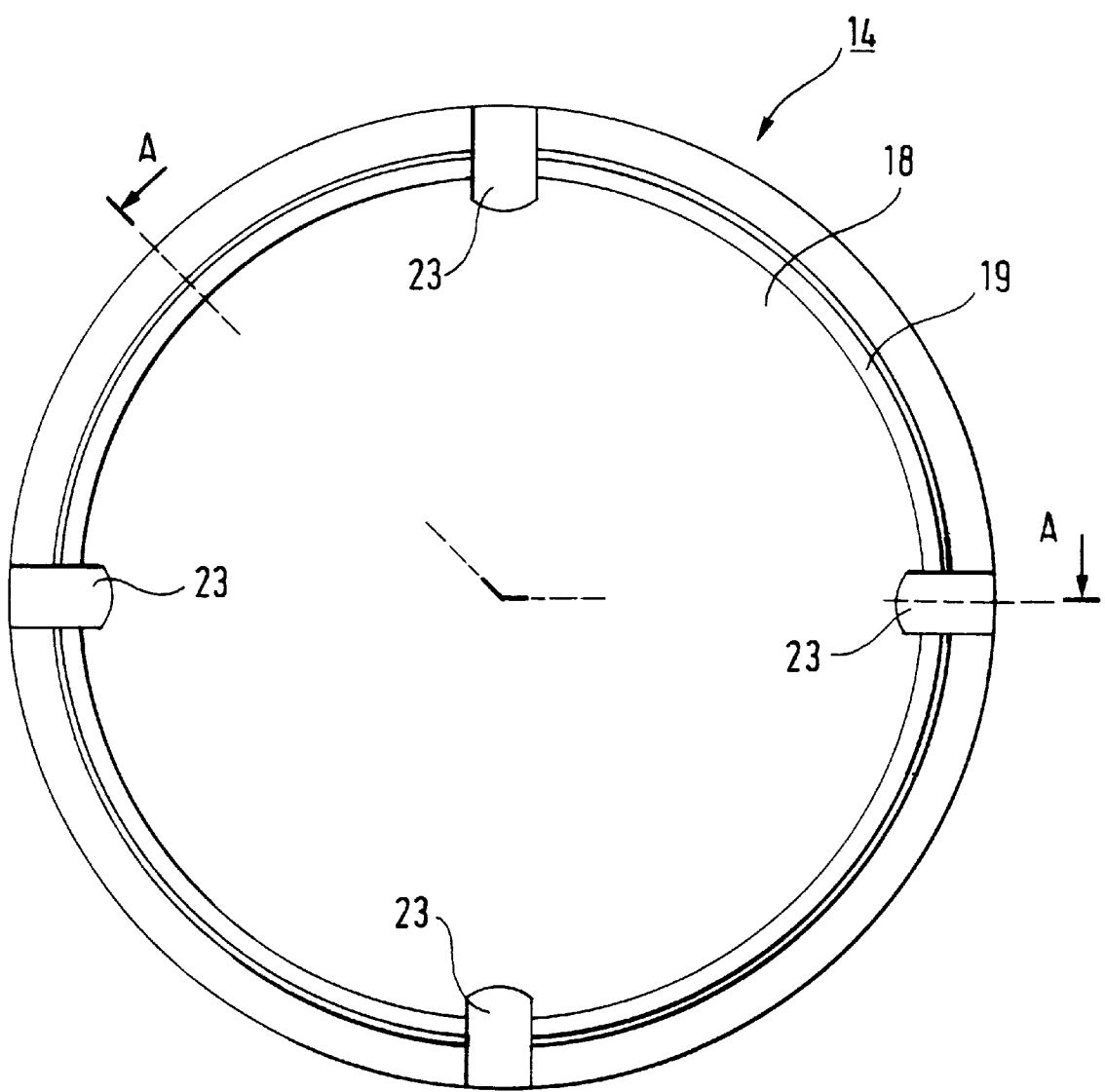
FIG. 3 is a bottom view of the rear part 14 from FIG. 2 shown in isolation.

FIGS. 2 and 3 show part of a telephone handset, in particular the earpiece part. As in FIG. 1, the handset includes an external housing 1 containing all the components of the handset and in particular the earpiece part in which the sound source converting electrical signals into sound pressure waves is a vibrating assembly in the form of a ceramic piezo-electric disk 3 glued by means of an electrically conductive glue to an electrically conductive support disk 4. The alternating electrical voltage representing the sound to be reproduced is applied between these two units by means of wires, not shown, soldered to them.

The housing also includes a board 11 supporting the electronic components 12 of the handset.

In the prior art handset shown in FIG. 1 the sound emitting vibrating component consisting of the combination of the piezo-electric disk 3 and its support disk 4 is enclosed in a capsule 2 disposed in the housing 1.

In accordance with the invention, this combination of the piezo-electric disk 3 with its support disk 4 is placed in a capsule that is integral with the housing 1.

The combination 3-4, referred to hereinafter as the vibrating assembly 13, is held in place in the housing 1 by virtue of the fact that the edge of the support disk 4 is clamped between two holding parts, a rear part 14 and a circular lateral wall 15 that is part of the housing 1.

The vibrating assembly 13 separates a first volume 16 (rear volume) from a second volume 17 (front volume). The first volume 16 is delimited by the vibrating assembly 13 and by said rear part 14 having a rear wall 18 facing the assembly 13 and a circular lateral wall 19.

The front volume 17 is delimited by the same vibrating assembly 13, a wall 20 facing said assembly and constituting part of the housing 1 and said circular lateral wall 15. In conjunction with holes 21 in the wall 20, the front volume 17 constitutes a Helmoltz resonator for amplifying high frequencies. The holes 21 have a diameter in the order of 1 mm, for example.

To attenuate the resonant peak around 1 000 Hz an acoustic damper is provided by producing micro-leaks in a wall of the rear volume 16.

In the preferred embodiment of the invention shown in FIGS. 2 and 3 the micro-leaks are produced by means of lateral slots 22. As shown in FIGS. 2 and 3, the slots 22 are produced by notches 23 in the lateral wall 19 of the rear part 14 which encroach slightly into the thickness of the wall 18 from the rear part 14 and by interrupting the bearing engagement at the location of these notches of the rear part 14 against a lateral wall 15A constituting part of the housing 1. There are four of these slots 22, for example, and they are very narrow, for example 0.08 mm. Micro-leaks via these lateral slots 22 escape laterally and the support board 11 can therefore be in direct contact with the wall 18 of the rear part 14. This eliminates the space $x$ in FIG. 1, so that the thickness of the housing 1 can be reduced commensurately. The gap $x$ was of 1 mm to 2 mm.

The fact that the "capsule" is integral with the housing also eliminates the 1 mm thickness $e$ of the gasket shown in FIG. 1 and the approximately 0.5 mm thickness $e_1$ of the bottom wall of the capsule 2 of the prior art earpiece (FIG. 1). The thickness of the housing 1 can therefore be further reduced by 1.5 mm. With the above disposition of the lateral slots, the reduction in the thickness due to the above disposition of the lateral slots 22 enabling the board 11 to be in contact with the wall 18, a total reduction in thickness between 2.5 mm and 3.5 mm is obtained, which is of great benefit in the case of a portable item.

Figure 4:
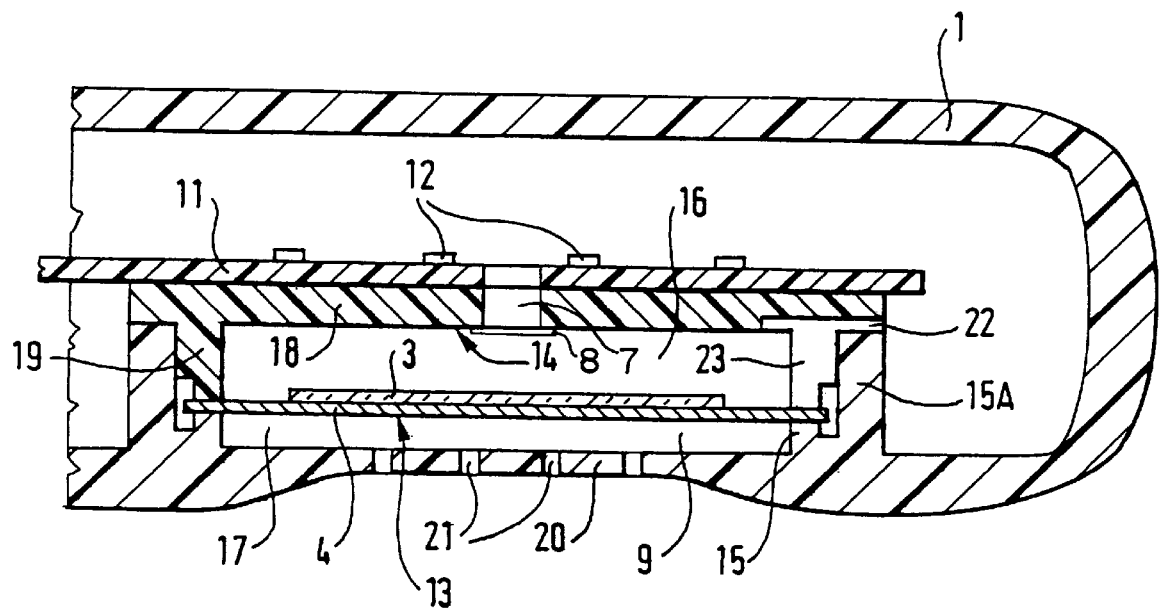
FIG. 4 is a further exemplary embodiment of the device shown in FIG. 2.

The elimination of the thickness $x$ due to the board 11 bearing directly against the wall 18 can be exploited by continuing to allow micro-leaks to escape via the rear wall 18, as shown in FIG. 4, by means of a hole 7 and a fabric 8 (to form micro-holes), provided that a hole is formed in the support board 11 exactly facing the hole 7.

This arrangement, which is also within the scope of the invention, is of less benefit, however, in that it requires a specially adapted support board 11.

There is claimed:

1. A telephone handset comprising a housing including an earpiece part including a piezo-electric disk joined to an electrically conductive support disk, the edge of said support disk being clamped between two holding parts;

a first volume delimited by the combination of said piezo-electric disk and its support disk, a rear wall facing said combination and a circular lateral wall, said rear wall and said lateral wall constituting a rear part adapted to allow micro-leaks through a portion of said rear part where said rear wall and said lateral wall meet to constitute, in conjunction with said first volume, an acoustic damper device;

a second volume, on a side of said combination opposite said first volume, constituting, in conjunction with holes in a wall of said second volume facing said combination, a Helmoltz resonator; and a board supporting electronic components in direct contact with said rear wall of said first volume.

2. The telephone handset claimed in claim 1 wherein said wall of said second volume facing said combination is part of said housing and constitutes the part of said wall of said housing adapted to be in contact with an ear of a user, said front volume also having a circular lateral wall constituting part of said housing and delimiting said volume.

3. The telephone handset claimed in claim 1 wherein said micro-leaks are enabled to escape from said rear part via lateral slots.

4. The telephone handset claimed in claim 1 wherein said micro-leaks are enabled to escape through said rear wall of said rear part and said support board.

* * * * *